Patented July 20, 1948

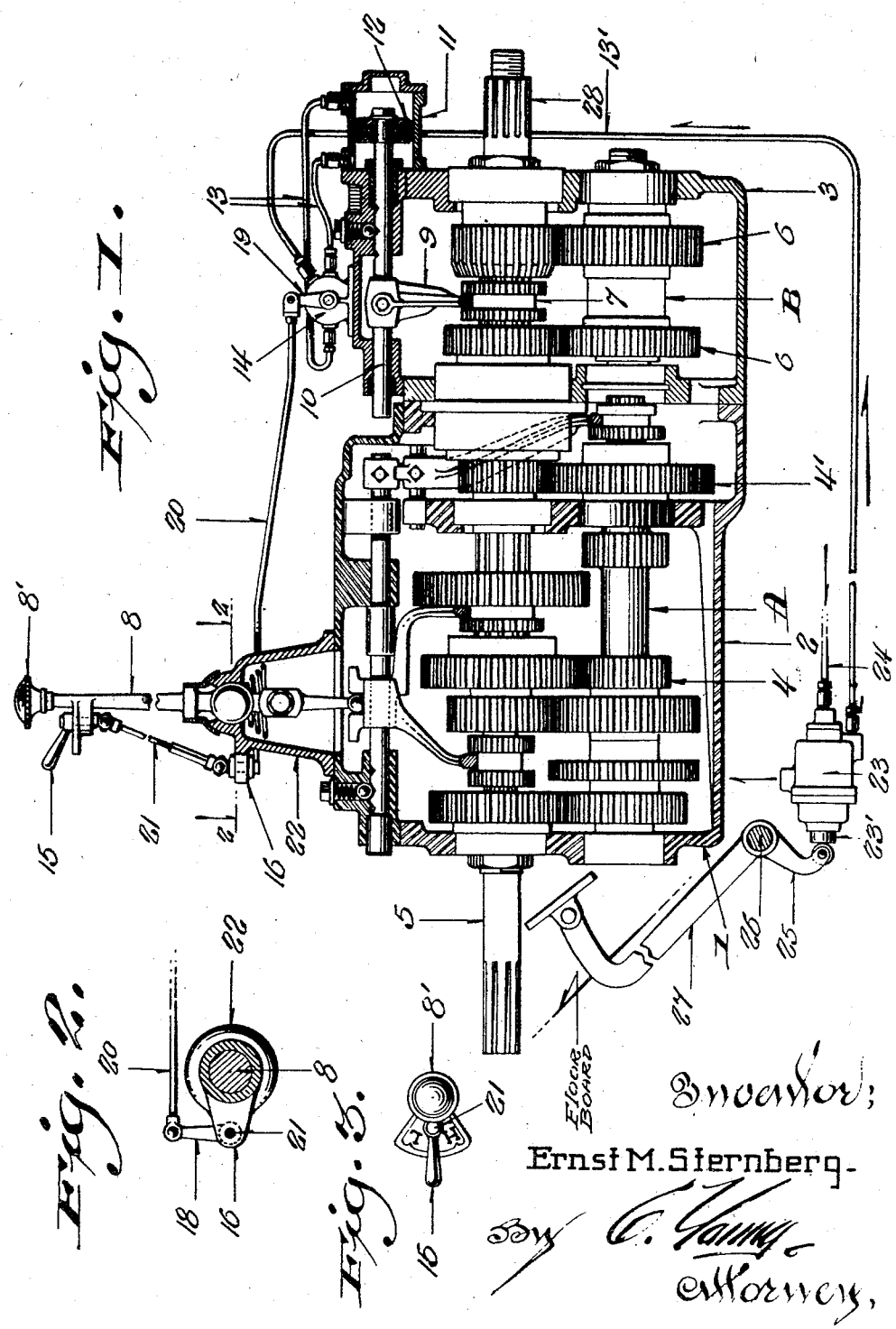

2,445,716

UNITED STATES PATENT OFFICE 2,445,716

DUAL TRANSMISSION CONTROL

Ernst M. Sternberg, Miami, Fla.; Ernest R. Sternberg administrator cum testamento annexo of said Ernst M. Sternberg, deceased Application March 30, 1944, Serial No. 528,712

3 Claims. (Cl. 74—338)

This invention relates generally to transmissions, and more particularly to automotive transmissions for heavy duty high speed trucks utilizing a main transmission in connection with an auxiliary or secondary transmission, each operated independently to provide required shifts for the most efficient operation of the truck.

At the present time heavy duty high speed motor trucks utilizing more than five forward speeds are equipped with dual transmissions, each controlled by an independent shift lever. The use of dual transmission resulting in 8, 10, 12 or 15 speed ratios is required in most heavy duty truck operations to provide maximum flexibility and economical performance over a wide range of operating conditions. To obtain performance at the lowest operating costs, a minimum number of gear shifts in sequence is essential. However, with present dual transmissions many "double shifts" as well as "gear skips" must be made rapidly to reduce loss of road momentum to a minimum. Since present dual transmissions require two shift levers, frequently necessitating the use of two hands to operate, and make no attempt to provide for shifting in sequence, inexperienced drivers are confused in trying to make the proper shift. Unless single or double shifts are completed quickly, and properly timed, they cannot be made without destructive effects on the gears.

Also in "double shifts," the shift levers must be moved frequently in opposite directions, requiring the simultaneous use of both hands of the operator, one for each shift lever. Under such conditions the wheel is controlled by either pressing the body, the forearm or knee of the operator against the wheel. This procedure and the fact that the driver usually takes his eyes off the road to locate and operate the levers does not provide for maximum safety. Consequently considerable mental and physical energy upon the part of the driver is absorbed in operating conventional dual transmission systems controlled independently by separate shift levers, and such controls do not permit the required shifts to be completed in the desired minimum length of time, and with minimum loss of road momentum. Because of this, drivers frequently make incomplete shifts, resulting in premature failure of transmission or other drive parts.

Therefore, equipment of the present type operated by a fatigued driver is a hazard on the highway. Furthermore there is an inclination to make "double shifts" carelessly, or incomplete shifts, and as a result road failures are premature and maintenance costs are excessive.

It is therefore the primary object of the present invention to provide an exceedingly simplified control for dual transmissions, which will enable the operator to make the required gear shifts with a single lever controlling one of the transmissions and equipped with a finger control of a fluid pressure operated mechanism for effecting shifts in the other transmission.

Incidental to the foregoing, a more specific object of the invention resides in the provision of a transmission system consisting of a main transmission, and an auxiliary transmission for obtaining direct or reduced drive of the main transmission, the main transmission being actuated manually by a gear shift lever upon which a finger control of a fluid pressure operated mechanism is mounted for actuating the auxiliary transmission.

Another object resides in the provision of a main control valve for the pressure fluid that is automatically opened upon release of the clutch to admit pressure fluid to the finger controlled valve, which is preset prior to initiating the shifting operation.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Fig. 1 is a vertical longitudinal sectional view of a 10 speed transmission equipped with one form of the present invention.

Fig. 2 is a detail sectional view taken on the line 2—2 of Fig. 1; and

Fig. 3 is a plan view of the main shift lever and finger control.

With particular reference to the drawing the numeral 1 designates generally a transmission casing consisting of front and rear sections 2 and 3, respectively, a main transmission A being housed in the forward section 2, while an auxiliary transmission B is mounted within the rear section 3.

Although a dual transmission is illustrated and will be described as contained within a unitary casing, it is to be understood that the transmissions may be separated and mounted in spaced casings without departing from the invention. The auxiliary transmission may also be mounted in the rear axle housing, as in the case of two speed axles.

The main transmission mounted in the forward section 2 of the casing 1 consists of the usual gear reductions 4, and an overdrive set of gears 4', as disclosed in my application Serial No. 430,865, now abandoned. The secondary or auxiliary transmission B provides for either direct or reduced drives from the main transmission.

Power is imparted to a drive shaft 5 for actuating the main transmission A and connected with the usual motor (not shown).

The auxiliary transmission B housed in the rear section 3 affords reduced indirect drive from the main transmission A through a set of reduction gears 6 and a sliding toothed clutch 7. A shaft 28 extending rearwardly from the auxiliary transmission B is for connection with a vehicle drive shaft (not shown).

For selection of the gear reductions 4 and overdrive gears 4' of the main transmission A, a standard shift lever 8 is universally mounted in the top of a domed bracket 22 carried by the cover of the forward casing 2. Shifts are accomplished through the usual forks carried by reciprocative rods.

Shifts in the auxiliary transmission 6 are obtained through a fork 9 engaging the toothed clutch 7 and secured on a shift rod 10 slidably journaled in the cover of the rear section 3.

As explained, in duel transmissions of the present type it is now the practice to provide a separate manually operated shift lever for each transmission. Therefore, the salient feature of the present invention resides in the provision of a power shifting mechanism for the auxiliary transmission, the same having a finger control mounted upon the selective shift lever of the main transmission within convenient reach of the operator's hand in its normal position on the shift lever.

In that form of the invention illustrated, the power shift is accomplished by compressed air, which serves to reciprocate the shift rod 10, and consequently the clutch 7. However, it is to be understood that other types of power, such as hydraulic, vacuum, electrical or mechanical, may be employed without departing from the invention.

As shown in the drawing, an air cylinder 11 is mounted on the cover of the rear casing section 3 for reception of a piston head 12 mounted on the projected end of the shift rod 10.

Air is admitted and exhausted from the opposite ends of the cylinder through the air lines 13 to reciprocate the piston head and shift rod. The lines 13 communicate with a conventional control valve 14, which in turn is connected through the line 13' with a master control valve 23 supplied from a reservoir, or other source of pressure fluid through the line 24.

The valve 23 is opened to admit fluid to the valve 14 by an arm 25 mounted on the clutch throw-out shaft 26 and engaging the end of a depressible valve plunger 23'. The throw-out shaft 26 is actuated by a conventional clutch pedal 27.

Control of the valve 14 is accomplished through actuation of a finger lever 15 mounted on the shift lever 8 convenient to the knob 8' gripped by the operator in shifting the lever, thus enabling the lever 15 to be shifted with the fingers of the same hand.

Pivotally mounted on a lug 16 projecting from the bracket 22 is an oscillating arm 18 connected with a lever 19 by a link rod 20 for operating the valve 14. A splined telescoping shaft 21 universally connected to the finger lever 15 and the arm 18 provides for oscillation of the arm through operation of said lever, and also compensates the actuation of the shift lever 8. Obviously a flexible shaft or wire connection could be employed between the finger lever 15 and the valve lever 19 without departing from the invention.

From the foregoing explanation, operation of the present invention will be apparent in that by means of the manual shift lever 8 selections in the main transmission A are obtained in the usual manner, while shifts in the auxiliary or secondary transmission B may be simultaneously effected through manipulation of the finger lever 15, which in turn sets the valve 14 to admit pressure fluid to one side of the piston 12 and shift the rod 10 to the desired position when the clutch is released.

Thus it will be seen that prior to effecting a manual shift in the main transmission, the desired shift in the secondary or auxiliary transmission is preset through setting of the valve 14 by the finger lever 15. When the clutch is then released to permit manual shifting, the valve 23 is opened and power shift in the secondary transmission automatically results. Therefore, one or both shifts can be made with one de-clutching operation.

The advantages of the invention are numerous as a result of the arrangement whereby two transmissions consisting of either main and auxiliary transmissions, or a main transmission and a two speed axle, may be simultaneously or independently controlled by the operator using one hand to operate a standard shift lever equipped with a finger-tip control.

The foregoing permits "double shifts" or "gear skips," one shift being obtained manually and the other by power, which leaves the other hand of the operator free for steering.

Also single or double shifts can be accomplished with one disengagement of the clutch, and in a minimum period of time to avoid needless waste of motor R. P. M.'s, consequently reducing fuel consumption to a minimum. This also assures longer clutch and tire life, as well as reduction of shock loads to the entire drive mechanism, resulting in longer life for these parts, and lower maintenance cost.

Many heavy duty trucks are called upon to operate off the highway on heavy rough ground, or to negotiate grades with heavy loads, which makes shifting difficult and where quick shifting is absolutely essential so as to avoid loss of road momentum or the possible stalling of the vehicle. With the present finger-tip control mounted on the main transmission shift lever, it is not necessary to push a button on the dash or operate a lever on the steering column, which is the present practice on some vehicles. Location of the secondary gear shift control in positions other than on the main transmission shift lever, causes a sufficient loss of time when making certain shifts, so it is impossible to fully engage the gears or complete the shifts under certain operating conditions, because the truck does not roll but stops quick and becomes mired, or when negotiating steep grades with heavy loads back slide occurs quickly. As a result, the gears clash, or are only partially engaged, causing premature failures.

Since gear shifts can be made quickly with the present invention, and with no more time or effort than is required to effect a shift with the present single speed change lever, because of preselective and automatic power shifting in the secondary transmission simultaneously with manual shifting of the main transmission, minimum driver energy is required, and the loss of road momentum is reduced to a minimum, resulting in higher average road speeds. Naturally, when normal road momentum is lost excess fuel is consumed because additional power is required to pick up such lost momentum. Only with a minimum of gear shifting, accomplished with the least effort, in the shortest possible time, can lowest ton miles costs be obtained, as accomplished by the present invention.

I claim the following:

1. In a dual transmission system including variable speed main and auxiliary transmissions, and a manually operated shift lever for selective control of the main transmission; manually actuated means for selective control of said auxiliary transmission, said means comprising a finger actuated lever mounted upon the exterior of said shift lever adjacent its upper end for oscillatory movement in a horizontal plane to its selective operative positions, said lever being within reach of the forefingers of the operator's hand when the palm engages the top of the lever to permit speed selections in both transmissions simultaneously or independently.

2. In a dual transmission system including variable speed main and auxiliary transmissions, and a manually operated shift lever for selective control of the main transmission; manually actuated means for selective control of said auxiliary transmission, said means comprising a finger actuated lever mounted upon the exterior of said shift lever adjacent its upper end for oscillatory movement in a horizontal plane to its selective operative positions, said lever being within reach of the forefingers of the operator's hand when the palm engages the top of the lever to permit speed selections in both transmissions simultaneously or independently, and a control connection between said finger actuated lever and said auxiliary transmission.

3. In a dual transmission system including variable speed main and auxiliary transmissions, and a manually operated shift lever for selective control of the main transmission; manually actuated means for selective control of said auxiliary transmission, said means comprising a finger actuated lever mounted upon the exterior of said shift lever adjacent its upper end for oscillatory movement in a horizontal plane to its selective operative positions, said lever being within reach of the forefingers of the operator's hand when the palm engages the top of the lever to permit speed selections in both transmissions simultaneously or independently, a control connection between said finger actuated lever and said auxiliary transmission, and means for indicating the operative position of said finger lever.

ERNST M. STERNBERG.

REFERENCES CITED

The following references are of record in the file of this patent:

UNITED STATES PATENTS

| Number | Name | Date |
|---|---|---|
| 1,702,721 | Charles | Feb. 19, 1929 |
| 1,716,814 | Case | June 11, 1929 |
| 1,815,772 | Gray | July 21, 1931 |
| 1,856,192 | Roeder | May 3, 1932 |
| 1,866,662 | Matthews | July 12, 1932 |
| 2,100,312 | Fawick | Nov. 30, 1937 |
| 2,138,065 | Layman | Nov. 29, 1938 |
| 2,185,730 | Griswold | Jan. 2, 1940 |
| 2,373,259 | Price | Apr. 10, 1945 |

FOREIGN PATENTS

| Number | Country | Date |
|---|---|---|
| 297,594 | Italy | June 16, 1932 |